Nov. 16, 1943.   F. G. PURINTON   2,334,352
FASTENER
Filed Nov. 4, 1942   2 Sheets-Sheet 1
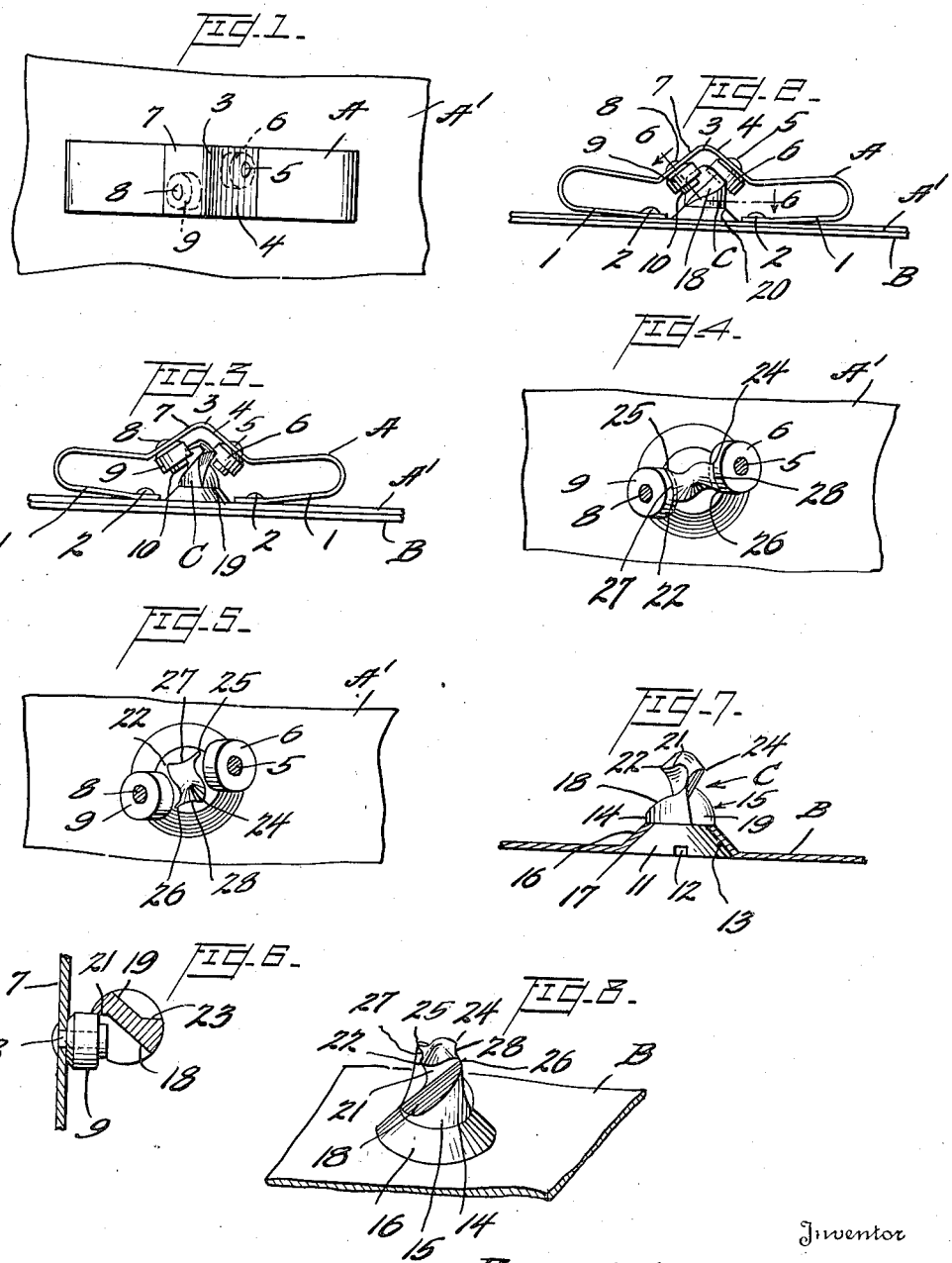
Inventor
Forrest G. Purinton,
By Parker Cook
Attorney

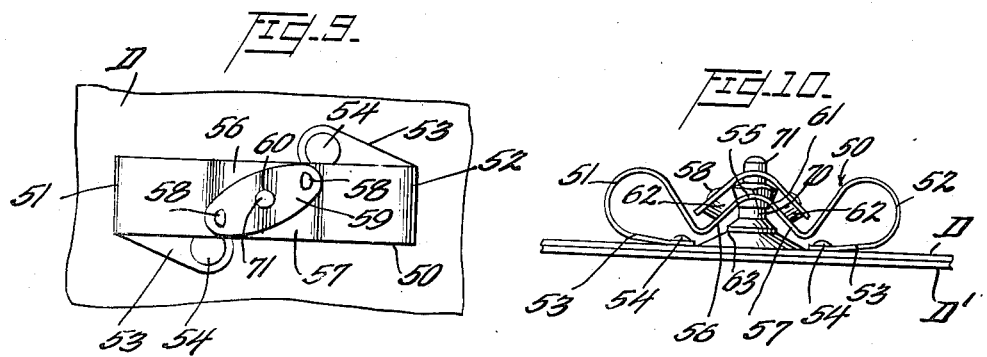

Patented Nov. 16, 1943

2,334,352

UNITED STATES PATENT OFFICE 2,334,352

FASTENER

Forrest G. Purinton, Waterbury, Conn., assignor to The Patent Button Company, Waterbury, Conn., a corporation of Connecticut Application November 4, 1942, Serial No. 464,481

17 Claims. (Cl. 24—221)

My invention relates to new and useful improvements in fasteners, and more particularly to a fastener that is especially adapted to hold two plates together, such as the cowling on airplanes and the like.

One of the objects of the present invention is to provide a fastener that is extremely efficient in operation, has relatively great holding power, will not gall or wear even after thousands of operations and is relatively inexpensive to manufacture.

Still another object of the invention is to provide a fastener consisting primarily of a body or resilient member on which are positioned rolling cones or cylinders. The planes of the axes of the rollers are parallel to and offset one on each side of the axis of the stud which has cooperating faces, so that there is a rolling contact as the stud advances between the two rollers. In other words, by offsetting the rolling cones, the center stud advances as it turns like a screw, to provide a pure rolling contact and no sliding component, thus assuring a fastener of long life and efficiency.

It might be mentioned that if cylinders are used in place of cones there will be an insignificant sliding component between the stud and the cylinders, so that hereafter in the specification wherein a pure rolling contact is spoken of it will be remembered that if cylinders are considered or illustrated the sliding component of the cylinders is so slight that for the purposes of the specification the words "cones" and "cylinders" may be used interchangeably.

Still another object of the invention is to provide a fastener wherein the several features, such as the entering walls, offset portions to place the spring member under tension and the locking surfaces, are all incorporated in the stud rather than in a socket member. These several component parts of the stud cooperate with rollers on the spring member, so that a pure rolling action will be obtained, as will be later pointed out in the specification.

Still another object of the invention is to provide a fastener wherein the stud may be readily and easily turned a quarter of a turn with but little effort to move the stud to a locking position, and after the stud is once locked it will have greater holding power than many other forms of similar fasteners now in use.

Still another object of the invention is to provide a fastener utilizing a stud of special construction and wherein the cooperating rolling cylinders or cones engaging the stud may be mounted on the under side of the resilient member, or if a somewhat stronger fastener is desired, the rolling cylinders may be mounted between the resilient member and an additional bridge plate so that the pins for the rollers, cylinders or cones will be rigidly supported at their opposite ends while the top of the bridge plate may be perforated so that the upper end or pilot of the stud may be centered therein.

In both instances, however, although the studs are somewhat different in construction, they are both provided with entrance features, tapered or offset working surfaces and locking seats, the offset or tapered surfaces providing a rolling action with the cylinders or cones to thus provide a maximum or contacting surface between the studs and the rollers, and also provide a fastener having great wearing qualities.

Still another object of the invention is to so provide the spring or resilient body member that it may bottom under a severe load and before the elastic limit of the spring is reached, to thus prevent any injury to the spring member if ever subjected to any unusual strain or force.

Still another object of the invention is to provide a fastener wherein the stud may be readily fastened to its plate, and after once in position cannot become accidentally disengaged therefrom.

With these and other objects in view, the invention consists in certain new and novel arrangements and combination of parts as will be hereinafter more fully described and pointed out in the claims.

Referring now to the drawings showing a preferred form and several modifications, Fig. 1 is a top plan view showing the spring member and its rollers;

Fig. 2 is a side view showing a fragmentary portion of two plates, together with the stud of the one plate extending within its spring member, the parts being in their locked position;

Fig. 3 is a similar view but showing the stud in a partially rotated position with respect to Fig. 2 and the fastener now in its unlocked position;

Fig. 4 is an enlarged top plan view showing the stud in its locked position, the spring with the exception of the rollers being omitted for the sake of clearness of illustration;

Fig. 5 is a similar view but showing the stud in its unlocked position;

Fig. 6 is a sectional view taken on line 6—6 of Fig. 2;

Fig. 7 is a side elevation of the stud showing the manner in which the stud is fastened to its plate and showing the offset walls or cam surfaces for cooperating with the rollers of the spring member;

Fig. 8 is a perspective of the stud showing it partially rotated from the position shown in Fig. 7;

Fig. 9 is a top plan view of a slightly modified form of fastener;

Fig. 10 is a side elevation showing the fragmentary portion of the two plates, the stud in the one plate being shown in locked position with its spring member;

Fig. 11 is an enlarged top plan view of the fastener, the spring and bow of the spring member being removed for the sake of clearness of illustration, and the parts being shown in their locked position;

Fig. 12 is a similar view but showing the stud in an unlocked position with relation to its cones;

Fig. 13 is an enlarged detail view of the stud showing the entrance faces, advancing cam surfaces and stops, and also showing the manner in which the stud is secured to its plate; and Fig. 14 is a side elevational view of a still further modified form of stud similar to the one shown in Fig. 7 but with the pilot of the stud shown in Fig. 13.

At the outset it might be mentioned that the studs as illustrated may be either solid or formed from hollow rivets, whichever may be found most expedient.

It will also be noted that although the stud is preferably formed of metal, it might be of a molded plastic having high impact strength.

Referring now more specifically to the invention, and for the moment to the preferred form, there is shown in Figs. 1, 2 and 3 what I term the resilient or spring member A, which is secured to the fixed plate A'. This resilient member is generally made of a flat spring metal strip having the ends bent inwardly to form the spring arms 1, which will be secured in place by the rivets 2, as may be seen in Figs. 2 and 3.

It will also be understood that these arms 1 might be slightly offset for convenience of riveting, as shown in Fig. 9 of the modified form.

The resilient member A is also bent angularly upward centrally of its length, as may be seen at 3, and on these oppositely extending walls are to be mounted the cylindrical rollers about to be described.

On the upwardly extending wall 4 is fixedly mounted the pin 5 while freely mounted on the pin may be seen the roller 6.

Likewise on the angular wall 7 and diametrically opposite from the pin 5 is a like pin or stud 8 with its roller 9.

The ends 10 of the two pins are headed to hold the rollers in position.

These small rollers in the preferred form are shown as of cylindrical shape, as they are somewhat more economical to make than conical shape rollers, but I do not wish to be in any way limited to cylindrical rollers, and in the modified form I have shown rollers of conical construction.

It might also be mentioned here that whether the rollers are cylindrical or conical their peripheries are to provide rolling contact with the opposite like angular extending faces on the stud, so that throughout the rotation of the stud when locking or unlocking the fastener, the stud will not slide with relation to the rollers, but will provide a full rolling contact therewith, thus presenting as little friction as possible.

Of course, one of the main objects of the cowl fastener is to provide a spring member on one plate that may be readily put under tension by the operation of the male or stud member on the other plate, and then the stud locked with relation to the spring member so that the two plates will be held tightly together, due to the tension exerted by the spring member. Of course, another desirable feature is to provide as little friction as possible between the stud and its resilient member, so that neither the stud nor its cooperating member will wear or gall by constant use.

Therefore, in the present instance, by utilizing rollers, cylinders or cones positioned at such an angle that there is rolling contact between the stud and the roller of the spring member, the life of the fastener will be prolonged.

The resilient member A and the mounting of the rollers may be varied so that the pins for the rollers may also be supported at their opposite ends and this will be described in detail when referring to the modified form.

Referring now to the construction of the cooperating stud and the manner in which it is secured to its plate and the manner in which it cooperates with the cylinders or rollers of the resilient member, reference is made to Figs. 4 to 7.

Here (Fig. 7), there is shown a fragmentary portion of the removable plate B in which the stud C is mounted. The stud consists of the head 11 with its kerf 12 and its tapering side walls 13 merging with the shank and has the overhanging ledge or rim 14 which, in fact, is the outer diameter of the shank 15 of the stud, so that the angular walls 16 about the opening 17 in the plate B through which the stud is passed may be rimmed or swedged beneath the ledge or rim 14 after the stud is placed therethrough, so that it will be impossible for the stud to become accidentally disengaged from its plate after once being fitted in position.

Still referring to the stud, it will be seen that it has the general appearance of a cone but is really made up of two cone-like surfaces which are in reality two like oppositely positioned helices having the entrance spaces 18 and 19. These permit the offset rollers 6 and 9 to fit within these helices and lie adjacent thereto (as may be readily seen in Fig. 3), when the stud is passed through the opening 20 in the plate A', the opening being centrally located beneath the spaced rollers, as may be readily seen in the several views.

Still referring to Fig. 7, there will be seen near the distal end of the stud the advancing cam face 21 or helix, with the end wall 22, and it will be noticed that this wall 22 extends in the same parallel plane with the periphery of its roller 9. A like cam face or helix 23 and a similar wall 24 is repeated on the opposite side of the stud so that when the one cam or working face 21 is cooperating with its roller 9 the like cam face 23 and its wall 24 will be cooperating with the opposite roller 6.

In Fig. 8 where the stud is shown in a still further partially rotated position, there may be seen the wall 25 and its oppositely positioned wall 26 which act as stops, so that when the stud is fitted within the helices and the rollers and rotated a quarter of a turn, the stud cannot be further rotated as the walls 25 and 26 will now abut against the rollers.

It will be noticed that between the wall 22 and the wall 25 and likewise between the wall 26 and the wall 24, the surfaces of the stud are slightly concave as at 27 and 28 to form what might be called pockets or seats for the rollers when the stud has been rotated through its quarter turn and the rollers are up against their stops. Thus, when the stud is in its locked position there is no possibility of a retrograde movement of the stud, as the rollers have rolled (snapped) into these relatively shallow pockets.

The operation of the stud and its resilient member is extremely simple, as after the two plates are placed in juxtaposition and the stud aligned so that the rollers will rest in the entrance spaces, a quarter turn of the stud to the right will cause the cam faces or helices 21 and 23 to contact with their respective rollers and due to the helices or working cam surfaces, pull the rollers downwardly, exerting a tension on the spring member to thus pull the plates towards each other, while at the end of the quarter rotation of the stud the rollers will snap within the pockets or seats 27 and 28 and bear against the stop walls 25 and 26, thus locking the plates under tension to each other.

To intentionally separate the plates, however, it is only the matter of a moment to again place a coin in the kerf and turn the stud in the opposite direction to roll the cylinders out of their seats and beyond the walls 22 and 24 along the helices or cam faces 21 and 23 until the rollers again lie freely within the entrance spaces 18 and 19.

As heretofore mentioned, by offsetting the rollers and having their axes parallel with the working cam faces on the stud, there is a rolling contact between the working parts of the stud and the rollers, thus providing a minimum amount of friction.

Referring now to a modified form the stud member is slightly different and the resilient member also slightly different from the preferred form.

In Fig. 9 the resilient member 50 consists of a relatively wide metal spring member having its ends bent in loop formation as at 51 and 52, the reentering ends 53 being riveted as at 54 to their plate D. The central portion of the member is also upwardly bowed as at 55 thus providing the angular walls 56 and 57 centrally of the resilient member, and in these walls are fastened the lower ends of the pins 58. The upper ends of the pins 58 are riveted to a like bowed plate 59 which is centrally perforated as at 60 and likewise the bowed portion of the resilient member 50 is perforated at 61 so that the stud (about to be mentioned) may extend up through the resilient member 50 and likewise the reinforcing plate 59.

On these pins 58 will be the small rollers 62 which are preferably conical in shape and are diametrically opposed, as it is the periphery of these rollers that cooperates with the stud (shortly to be mentioned).

Thus it will be seen that rather than having the pins for the rollers supported at their one end, in this instance they are supported at both ends to thus provide a somewhat stronger construction.

The plate D, of course, is perforated as at 63 centrally beneath the spaced rollers and the walls about the opening are swedged upwardly as may be seen in Fig. 10.

The swedged walls perform two functions. They permit the swedged wall about the stud (about to be mentioned) to nest therein so the plates can contact and they will also permit the central portion of the spring member to bottom thereon in case of an unnatural or severe load put on the stud, which will thus prevent any excess flexing of the spring to thus avoid loading the spring beyond its elastic limit.

Referring now to the stud E illustrated in detail in Fig. 13, it will be noticed that it is mounted in what will be the movable plate D' and consists of the head 64 with its kerf 65, tapered side walls 66 and overhanging ledge 67. Thus, after the stud is placed within the opening 68 in the plate D', the walls 69 may be rimmed or swedged beneath the ledge 67 so that after the stud is once fastened to its plate, it cannot become accidentally disengaged therefrom.

The shank may be reduced as at 70 and again at its distal end 71 to form the pilot, leaving the enlarged portion 72 about centrally of its length.

The periphery of the enlarged portion tapers inwardly as at 73, and is provided with two oppositely positioned flat faces 74 and two small oppositely positioned depressions or seats 75, while the far wall 76 of each depression extends slightly outwardly to prevent an undue turning movement of the stud and to lock the stud when the rollers are seated in the depression 75 heretofore mentioned.

The flat faces provide for the entrance of the stud between the conical rollers. Thus, as may be seen in Fig. 13, we have the entrance face 74 and successively, the working tapered face 73 and the seat 75 plus the stop wall 76 and this, of course, is repeated on the opposite side of the stud.

It will be noticed that the tapered working face 73 of the stud is parallel with the working surfaces of the conical offset rollers, so that there is a rolling surface at all times that the rollers engage the working faces of the stud, thus reducing the friction to a minimum and allowing the stud to be rotated its quarter turn to place the spring under tension and lock the parts together with a minimum amount of effort.

Inasmuch as the entrance face, working face, seat and limiting walls are duplicated on the stud, these faces each cooperate with their own roller to thereby provide a relatively strong fastener.

The upper end of the stud or pilot 71 centers within the opening in the plate 59, thus helping to guide the stud into position.

Referring now for the moment to Fig. 14 there may be seen a stud 77 that is similar to the stud shown in Fig. 8 with one addition, and that is a pilot 78 similar to the pilot 71 shown on the stud in Fig. 13.

The helices, seats and walls are all identical with that shown in the preferred form in Fig. 8, but there is the additional pilot which will center within the opening in the plate 59 to thus help guide the stud into position in the same manner that the pilot shown in Fig. 13 operates.

It will be understood that I much prefer using a stud as shown in Fig. 14 with this modified form of resilient member as a pure rolling contact between the conical rollers and the stud provided with the helices and the other various mentioned features can be effected. Also, it takes much less effort to rotate the stud to a locking position.

Finally, it will be understood that in both the preferred and modified forms of resilient members where I have shown pins or studs with rollers thereon which are illustrated as either being cylindrical or conical, I might use plain studs which would be fastened to the resilient member and dispense with the cylindrical or conical rollers and have the cam faces or helices of the main stud contact these small studs of the resilient member to effect the locking and unlocking of the fastener. Here, however, although the construction would be less costly the friction would be greater, the studs wear more quickly and it would take more effort to lock and unlock the fastener.

From the foregoing it will be seen that in the preferred and modified forms of fastener, the operating and locking faces, etc., are incorporated in the stud and the stud in turn engaging cylindrical or conical rollers, so that there is no slipping or sliding action, but always a rolling contact both on the locking and unlocking of the fastener.

The modified form of resilient member is somewhat of a stronger construction, as it has an additional bow plate and furthermore has the pins—that support the rollers—supported at both their ends.

It will also be seen that after the studs are once fastened in their plate, they cannot become accidentally disengaged therefrom, but on the other hand may be quickly turned either to a locked or unlocked position by the insertion of a coin in the kerf and then the rotative movement applied.

In the preferred form any undue load placed on the spring would cause the rollers to bottom on the stud whereas in the modified form a portion of the spring member itself may bottom on the plate to prevent any excess load being placed on the spring.

Many slight changes might be made without in any way departing from the spirit and scope of the invention.

Having thus described my invention, what I claim as new and desire to secure by Letters Patent is:

1. A fastener for holding two plates and the like together, including a resilient member having rollers secured thereto, the resilient member adapted to be secured to one plate, a cooperable stud rotatably secured to the other plate and said stud having entrance spaces, cam faces and seats formed on the shank thereof, the cam faces of the stud overlying said rollers whereby a part rotation of the stud will cause the cam faces to advance on said rollers and place the spring member under tension, and said rollers fitting within said seats at the end of the rotation of the stud to thereby lock the stud with relation to said rollers.

2. A fastener for holding two plates and the like together, including a resilient member having rollers secured thereto, the resilient member adapted to be secured to one plate, a cooperable stud secured in the other of said plates and the stud having entrance spaces, cam surfaces, seats and stop walls formed on the shank thereof, the cam faces on the stud extending parallel with the axis of the rollers and overlying said rollers whereby a part rotation of the stud will cause the cam faces to force said rollers inwardly and place the spring member under tension, said rollers fitting within said seats at the end of the rotation of the stud to thereby lock the stud with relation to said rollers and the stop walls on the stud limiting the rotative movement of said stud.

3. A two-part fastener including a stud having entrance spaces, advancing cam surfaces and seats formed on the shank thereof, together with a resilient member having two offset cooperating rollers angularly positioned with relation to the axis of the stud so that a partial rotation of the stud when positioned between said rollers will provide a rolling contact between the rollers and the cam surfaces to place the resilient member under tension and lock the stud with relation to the rollers.

4. A two-part fastener including a stud having oppositely disposed entrance spaces, advancing cam surfaces, seats and stop walls formed on the shank thereof, a resilient member having two offet cooperating rollers angularly positioned with relation to the stud so that a partial rotation of the stud when positioned between said rollers and the cam surfaces overlying said rollers will provide a rolling contact between the rollers and the cam surfaces to place the resilient member under tension, snap the rollers within the seats and lock the stud with relation to the rollers, and the stop walls contacting with the rollers and preventing the same from being advanced beyond their seats on the stud.

5. A fastener for holding two plates and the like together, including a stud, the stud adapted to be rotatably secured to one plate, the shank of the stud provided with oppositely disposed entrance spaces, oppositely disposed cam surfaces adjacent the respective faces, oppositely disposed seats adjacent the cam surfaces and oppositely disposed stop walls adjacent the seats, a resilient member adapted to be secured to the other plate having cooperating offset rollers adapted to pass within said entrance spaces and to be acted on by the cam faces on a partial rotation of the stud to thereby place the resilient member under tension and hold the plates tightly together.

6. A two-part fastener for holding plates and the like including a stud, the said stud adapted to be rotatably secured to one plate, the shank of the stud provided at its outer end with oppositely disposed helices, oppositely disposed seats adjacent the helices and oppositely disposed stop walls adjacent the seats, a resilient member adapted to be secured to the other of said plates, the said resilient member having rollers adapted to fit within said helices and be acted on by the walls thereof whereby a partial rotation of the stud will place the resilient member under tension and force the plates tightly together.

7. A fastener for holding two plates and the like together including a resilient member having offset rollers secured thereto, the resilient member adapted to be secured to one plate, a cooperable stud rotatably secured to the other plate and having oppositely disposed entrance spaces, cam faces and seats for the offset rollers, a part of the walls of the cam faces overlying said rollers when the stud is positioned between them whereby equal increments of stud rotation will cause increments of stud advance along the stud axis to thereby place the spring member under tension and pull the plates tightly together.

8. A fastener for holding two plates and the like to each other including a resilient member having bowed reentrant ends adapted to be secured to one of said plates, the said resilient member also being bowed centrally, a bridge plate overlying said bowed central portion and offset rollers secured between said central bowed portion and said bridge plate, the bowed portion of the resilient member and the bridge plate being centrally perforated to receive a stud; together with a stud having cam faces overlying said rollers whereby a rotation of said stud will cause the cam faces operating on said rollers to place the said resilient member under tension while the locking seats will also releasably hold said rollers to thereby lock the stud with relation to said rollers when the spring member is under tension.

9. A fastener for holding two plates and the like together including a centrally bowed resilient member, a bowed plate, pins secured between the bowed plate and the bowed portion of the resilient member, rollers mounted on said pins, the bowed member being perforated, the rollers angularly positioned from the vertical and offset with relation to each other together with a stud having oppositely disposed entrance spaces, cam surfaces and locking seats adapted to cooperate with said rollers and to place said resilient member under tension and lock the same with relation to said stud when said stud is rotated one quarter turn from its entrant position.

10. A fastener for holding two plates and the like together including a stud, the stud adapted to be rotatably secured to one plate, the shank of the stud provided with oppositely disposed entrance spaces, oppositely disposed cam surfaces adjacent the respective spaces, oppositely disposed seats adjacent the cam surfaces and oppositely disposed stop walls adjacent the seats, a resilient member adapted to be secured to the other plate and in spaced relation thereto, cooperating offset rollers on the under surface of the said resilient member and adapted to pass within said entrance spaces and to be acted on by the cam faces on a partial rotation of the stud to thereby place the resilient member under tension and hold the plates tightly together, and the said rollers adapted to bottom on the plate to which the resilient member is secured if a predetermined load is exceeded.

11. A fastener for holding two plates and the like together including a stud, the stud adapted to be rotatably fitted in one plate, the shank of the stud provided with oppositely disposed cam surfaces thereon, together with a resilient member adapted to be secured to the other plate and in spaced relation thereto, cooperating offset rollers on the under surface of said resilient member and adapted to be acted on by the cam faces on said stud on a partial rotation thereof to thereby place the resilient member under tension and the said rollers adapted to bottom if the resilient member is subjected to an overload.

12. A fastener for holding two plates and the like together including a stud, the stud adapted to be rotatably fitted in one plate, the shank of the stud provided with oppositely disposed cam surfaces thereon, together with a resilient member adapted to be spacedly secured to the other of said plates, offset rollers on said resilient member and adapted to be acted on by the cam faces on said stud on a partial rotation thereof to thereby place the resilient member under tension and the resilient member adapted to bottom on its plate if the same is subjected to an overload.

13. A fastener for holding two plates and the like together including a stud, the stud adapted to be rotatably fitted in one plate, the shank of the stud provided with a pilot and oppositely disposed cam surfaces adjacent the pilot, seats adjacent the cam surfaces, together with a resilient member adapted to be spacedly secured to the other of said plates, rollers on said resilient member and adapted to be acted on by the cam faces on said stud on a partial rotation thereof to thereby place the resilient member under tension and force said rollers in said seats to hold the stud and resilient member in locked relation with each other and the said resilient member adapted to bottom if an overload is placed on said resilient member.

14. A two part fastener including a stud having oppositely disposed helices formed thereon, axially extending concave locking seats adjacent the helices, a resilient member having cooperative means adapted to fit within said helices whereby on a part rotation of the stud the resilient member will be placed under tension and the said cooperating means will snap within said axially extending seats at the completion of the rotation to thereby lock the stud with relation to its cooperating means.

15. In a fastener for holding two plates and the like together including a stud having oppositely disposed entrance spaces at its outer end, oppositely disposed helices registering with the respective entrance spaces, axially extending seats on the stud and at the remaining ends of the said helices, stop walls adjacent the seats and forming a part thereof and the said fastener provided with a head for rotating the same.

16. In a fastener for holding two plates and the like together, a stud having entrance spaces at its outer end, oppositely disposed cam faces in the form of partial threads registering at their one ends with the respective entrance spaces, axially extending seats formed adjacent said cam faces and at the remaining ends of the said threads, the far walls of the seats extending in planes parallel with the axis of the stud and extending substantially throughout the length of the stud and forming stop walls and a head on said stud for rotating the same.

17. In a fastener for holding two plates and the like together a stud having a pilot formed on its outer end, the said stud also having oppositely disposed entrance spaces adjacent said pilot, oppositely disposed helices registering with the respective entrance spaces, axially extending seats on the stud at the remaining ends of said helices, stop walls adjacent the seats and forming a part thereof and the said fastener provided with a head for rotating the same.

FORREST G. PURINTON.